(12) United States Patent
Sugino

(10) Patent No.: US 8,430,783 B2
(45) Date of Patent: Apr. 30, 2013

(54) AUTOMATIC TRANSMISSION

(75) Inventor: Soichi Sugino, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 454 days.

(21) Appl. No.: 12/771,125

(22) Filed: Apr. 30, 2010

(65) Prior Publication Data

US 2010/0311534 A1  Dec. 9, 2010

(30) Foreign Application Priority Data

Jun. 4, 2009  (JP) ................. 2009-135223

(51) Int. Cl.
*F16H 3/62*  (2006.01)

(52) U.S. Cl.
USPC ........................................ 475/276

(58) Field of Classification Search ............... 475/286, 475/275, 221, 210, 207, 330
See application file for complete search history.

(56) References Cited

U.S. PATENT DOCUMENTS 6,746,358 B2 * 6/2004 Bucknor et al. ............ 475/276
7,524,257 B2   4/2009 Tabata et al.
7,674,202 B2 * 3/2010 Wittkopp et al. .......... 475/286
2006/0128518 A1 * 6/2006 Bucknor et al. .......... 475/279
2007/0184932 A1   8/2007 Tabata et al.

FOREIGN PATENT DOCUMENTS

JP   2005-273768 A   10/2005

* cited by examiner

*Primary Examiner* — David D Le
*Assistant Examiner* — David J Hlavka
(74) *Attorney, Agent, or Firm* — Westerman, Hattori, Daniels & Adrian, LLP

(57) ABSTRACT

Provided is an automatic transmission capable of reducing friction loss. A first element (Sa) is coupled with an input shaft (2), a second element Ca is coupled with a first driving gear (G1a). A first driven gear (G1b) is pivotally supported on an output shaft (3), a seventh element (Rc) is coupled with a second driving gear (G2a), and a second driven gear (G2b) is fixed to the output shaft (3). A third element (Ra) and a fifth element (Cb) are coupled to form a first coupling body, a sixth element (Rb) and a ninth element (Sc) are coupled to form a second coupling body. The automatic transmission includes a first engagement mechanism (C1) coupling the input shaft (2) and the eight element (Cc) releasably, a second engagement (C2) fixing the first driven gear (G1b) to the output shaft (3) releasably, a third engagement mechanism (C3) coupling the second element (Ca) with the second coupling body releasably, and a fourth to a sixth engagement mechanisms (B1 to B3) fixing respectively the first coupling body, a fourth element (Sb) and the eighth element (Cc) to a transmission case (1) releasably.

5 Claims, 4 Drawing Sheets

FIG.3

| | C1 | C2 | C3 | B1 | B2 | B3 | F1 | GEAR RATIO | COMMON RATIO |
|---|---|---|---|---|---|---|---|---|---|
| Rev | | | O | | O | O | | 2.707 | 64.5% |
| 1 | | O | | | O | (O) | O | 4.195 | 1.705 |
| 2 | | O | | O | O | | | 2.461 | 1.641 |
| 3 | | O | O | | O | | | 1.500 | 1.350 |
| 4 | O | O | | | O | | | 1.111 | 1.144 |
| 5 | O | O | O | | | | | 0.971 | 1.195 |
| 6 | O | | O | | O | | | 0.812 | 1.117 |
| 7 | O | | O | O | | | | 0.727 | 1.164 |
| 8 | O | | | O | O | | | 0.625 | 6.714 |

AUTOMATIC TRANSMISSION

BACKGROUND OF THE INVENTION

1. Field of the Invention

The present invention relates to an automatic transmission which changes rotations of an input shaft into multiple gear speeds transmitted to an output shaft via a plurality of planetary gear mechanisms disposed in a transmission case.

2. Description of the Related Art

Conventionally, there has been known an automatic transmission (for example, refer to Japanese Patent Laid-Open No. 2005-273768) which performs 8 forward gear speed changes via a first planetary gear for inputting, two planetary gears for gear change and six engagement mechanisms.

The first planetary gear in the automatic transmission disclosed in Japanese Patent Laid-Open No. 2005-273768 is of a double-pinion planetary gear mechanism comprised of a first sun gear, a first ring gear, and a first carrier pivotally supporting a pair of first pinions, which are intermeshed with each other with either one intermeshed with the first sun gear and the other one intermeshed with the first ring gear, in such a way that the pair of first pinions can rotate and revolve freely.

In the first planetary gear, the first sun gear is equivalent to a fixing element fixed to a transmission case, the first carrier is equivalent to an input element coupled with an input shaft, and the first ring gear is equivalent to an output element configured to decelerate a rotation speed of the first carrier equivalent to the input element and output the decelerated rotation speed.

The two planetary gears for gear change are of a Ravigneaux planetary gear mechanism comprised of a second sun gear, a third sun gear, a second ring gear integral with a third ring gear, and a second carrier pivotally supporting a pair of second pinions, which are intermeshed with each other with either one intermeshed with the second sun gear and the second ring gear and the other one intermeshed with the third sun gear, in such a way that the pair of second pinions can rotate and revolve freely.

In the Ravigneaux planetary gear mechanism, the second sun gear is equivalent to a first rotation element, the second carrier integral with the third carrier is equivalent to a second rotation element, the second ring gear integral with the third ring gear is equivalent to a third rotation element, and the third sun gear is equivalent to a fourth rotation element in the order of distances relative to gear ratios in a velocity diagram.

The engagement mechanisms are comprised of a first engagement mechanism releasably coupling the first ring gear equivalent to the output element of the first planetary gear with the fourth rotation element composed of the third sun gear, a second engagement mechanism releasably coupling the input shaft with the second rotation element composed of the second carrier, a third engagement mechanism releasably coupling the first ring gear equivalent to the output element with the first rotation element composed of the second sun gear, a fourth engagement mechanism releasably coupling the first carrier equivalent to the input element with the first rotation element composed of the second sun gear, a fifth engagement mechanism releasably fixing the first rotation element composed of the second sun gear to the transmission case, and a sixth engagement mechanism releasably fixing the second rotation element composed of the second carrier to the transmission case.

According to the configurations mentioned above, a first gear speed is established when the first engagement mechanism and the sixth engagement mechanism are engaged; a second gear speed is established when the first engagement mechanism and the fifth engagement mechanism are engaged; a third gear speed is established when the first engagement mechanism and the third engagement mechanism are engaged; a fourth gear speed is established when the first engagement mechanism and the fourth engagement mechanism are engaged.

A fifth gear speed is established when the first engagement mechanism and the second engagement mechanism are engaged; a sixth gear speed is established when the second engagement mechanism and the fourth engagement mechanism are engaged; a seventh gear speed is established when the second engagement mechanism and the third engagement mechanism are engaged; an eighth gear speed is established when the second engagement mechanism and the fifth engagement mechanism are engaged. In addition, if the first gear speed or the eighth gear speed is excluded, it is possible to establish 7 forward gear speeds.

In the conventional transmission, the engagement mechanisms to be engaged in each gear speed are two. Thereby, the dragging among the other four freed engagement mechanisms will make friction loss become greater, deteriorating the efficiency of the automatic transmission.

SUMMARY OF THE INVENTION

The present invention has been accomplished in view of the aforementioned problems, and it is therefore an object of the present invention to provide an automatic transmission capable of reducing friction loss.

The present invention provides an automatic transmission which changes rotations of an input shaft into multiple gear speeds transmitted to an output shaft via a plurality of planetary gear mechanisms disposed in a transmission case. The automatic transmission includes: three planetary gear mechanisms including a first planetary gear mechanism, a second planetary gear mechanism and a third planetary mechanism, a first gear train composed of a first driving gear and a first driven gear intermeshed with the first driving gear, and a second gear train composed of a second driving gear and a second driven gear intermeshed with the second driving gear. The third planetary gear mechanism is of a single-pinion planetary gear mechanism comprised of a sun gear, a ring gear, and a carrier pivotally supporting a pinion intermeshed with the sun gear and the ring gear in such a way that the pinion can rotate and revolve freely, three elements comprised of a sun gear, a carrier and a ring gear of the first planetary gear mechanism are set as a first element, a second element and a third element, respectively, in the order of distances relative to gear ratios in a velocity diagram, three elements comprised of a sun gear, a carrier and a ring gear of the second planetary gear mechanism are set as a fourth element, a fifth element and a sixth element, respectively, in the order of distances relative to gear ratios in the velocity diagram, three elements comprised of the sun gear, the carrier and the ring gear of the third planetary gear mechanism are set as a seventh element, an eighth element and a ninth element, respectively, in the order of distances relative to gear ratios in the velocity diagram, the first element is coupled with the input shaft, the second element is coupled with the first driving gear, the first driven gear is pivotally supported on the output shaft, the seventh element is coupled with the second driving gear, the second driven gear is fixed to the output shaft, the third element and the fifth element are coupled to form a first coupling body, the sixth element and the ninth element are coupled to form a second coupling body, a first engagement mechanism couples the input shaft with the eighth element releasably, a second engagement mechanism couples the first driven gear to the output shaft releasably, a third engagement mechanism couples the second element with the second coupling body releasably, a fourth engagement mechanism fixes the first coupling body to the transmission case releasably, a fifth engagement mechanism fixes the fourth element to the transmission case releasably, a sixth engagement mechanism fixes the eighth element to the transmission case releasably. As to be made clear by an embodiment to be described hereinafter, according to the first aspect of the present invention the automatic transmission can perform 7 forward gear speed changes or even more, and in each gear speed change, three of the six engagement mechanisms from the first to the sixth engagement mechanism are engaged. Thereby, in each gear speed change, the freed engagement mechanisms are three. In comparison with the conventional transmission in which the freed engagement mechanisms are four, the friction loss caused by the freed engagement mechanisms is reduced, and consequently, the efficiency of the automatic transmission is improved.

Rotations of the input shaft are transmitted to the output shaft via the first gear train or the second gear train. Therefore, it is easy to change a gear ratio for each gear speed by adjusting the gear ratios (the number of teeth of the driven gear/the number of teeth of the driving gear) of the two gear trains, improving the freedom in setting the gear ratio for each gear speed.

In the automatic transmission of the present invention, it is preferable that each of the first and the second planetary gear mechanisms is of a single-pinion planetary gear mechanism comprised of a sun gear, a ring gear, and a carrier pivotally supporting a pinion intermeshed with the sun gear and the ring gear in such a way that the pinion can rotate and revolve freely.

According to the mentioned configuration, in comparison with the case where at least one of the first and the second planetary mechanisms is of a double-pinion planetary mechanism composed a sun gear, a ring gear and a carrier pivotally supporting a pair of pinions, which are intermeshed with each other with either one intermeshed with the sun gear and the other one intermeshed with the ring gear, in such a way that the pair of pinions can rotate and revolve freely, the number of intermeshing times can be reduced, and consequently, the efficiency of the automatic transmission is improved.

In the automatic transmission of the present invention, it is preferable that the sixth engagement mechanism is a one-way clutch or a two-way clutch. According to the mentioned configuration, it is possible to better control the gear changes between the first gear speed and the second gear speed in comparison with the case where the sixth engagement mechanism is formed from a wet multi-plate clutch only.

In the automatic transmission of the present invention, it is preferable that the second engagement mechanism is an intermeshing mechanism. As to be made clear by an embodiment to be described hereinafter, according to the mentioned configuration, the second intermeshing mechanism which is engaged only in a range of low forward gear speeds and freed only in a range of high forward gear speeds functions as a mechanism avoiding the friction loss. Thereby, the friction loss can be further inhibited in the range of high forward gear speeds, and consequently, the efficiency of the automatic transmission is further improved.

The second engagement mechanism is configured to transmit the rotations to the output shaft via the first gear train or the second gear train. Compared with the case where an engagement mechanism disposed in the input shaft provided with a planetary mechanism serves as the intermeshing mechanism, relative wider space is saved to allow more freedom in arranging and designing the intermeshing mechanism.

BRIEF DESCRIPTION OF THE DRAWINGS

FIG. 3 is an explanatory diagram illustrating engagement states of engagement mechanisms in each gear speed of the automatic transmission according to the first embodiment.

DETAILED DESCRIPTION OF THE PREFERRED EMBODIMENTS

Figure 1:
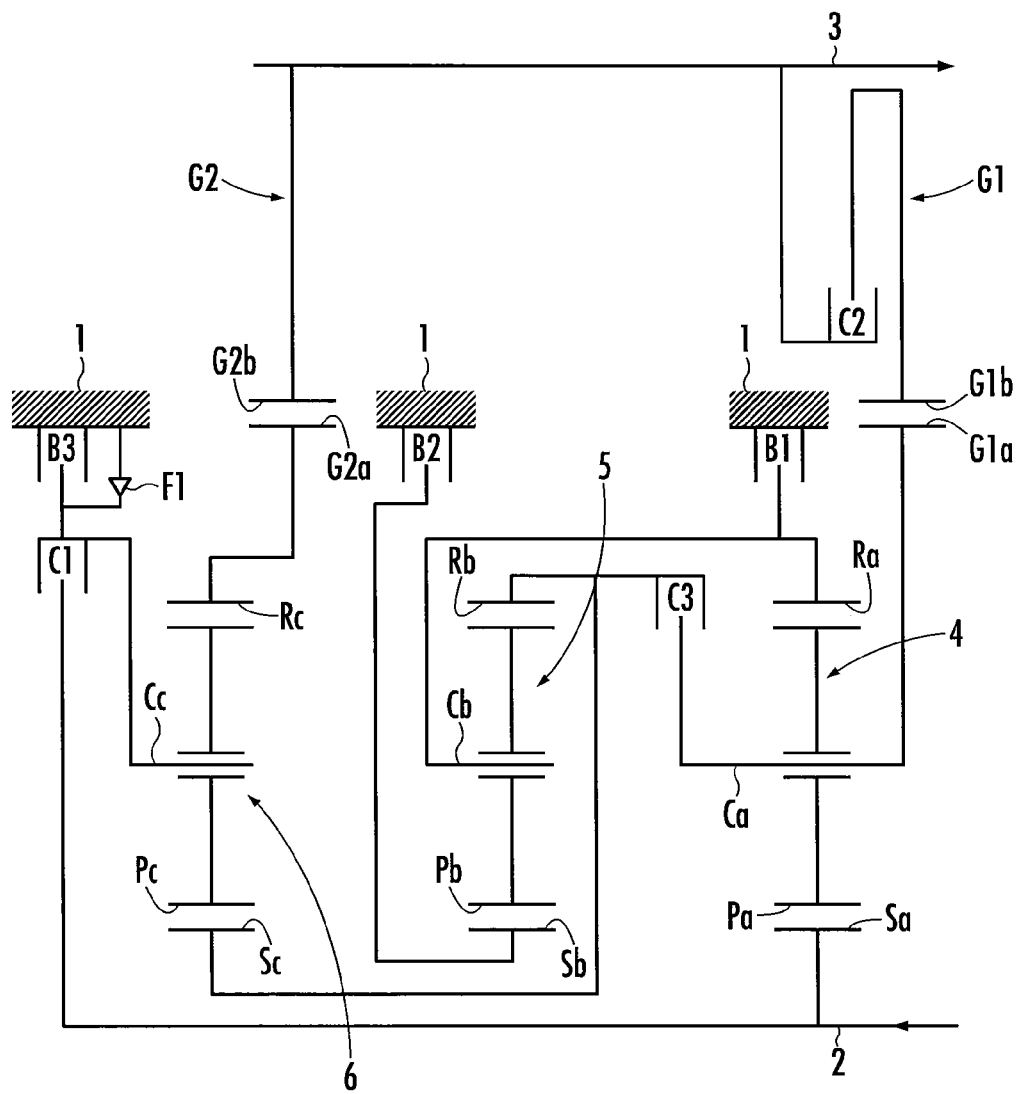
FIG. 1 is a skeleton diagram of an automatic transmission according to a first embodiment of the present invention.

An automatic transmission according to a first embodiment of the present invention is illustrated in FIG. 1. The automatic transmission of the first embodiment is provided with a transmission case 1, an input shaft 2 and an output shaft 3. The input shaft 2 is pivotally supported inside the transmission case 1 and coupled with a driving source such as an engine (not shown). The output shaft 3 is disposed in parallel to the input shaft 2. Rotations of the output shaft 3 are transmitted to driving wheels disposed at both sides of a vehicle via a differential gear, a propeller or the like (not shown).

Further, a first planetary gear mechanism 4, a second planetary gear mechanism 5 and a third planetary gear mechanism 6 are disposed concentrically with the input shaft 2 inside the transmission case 1. The first planetary gear mechanism 4 is a single-pinion planetary gear mechanism comprised of a sun gear Sa, a ring gear Ra, and a carrier Ca pivotally supporting a pinion Pa intermeshed with the sun gear Sa and the ring gear Ra in such a way that the pinion Pa can rotate and revolve freely.

Figure 2:
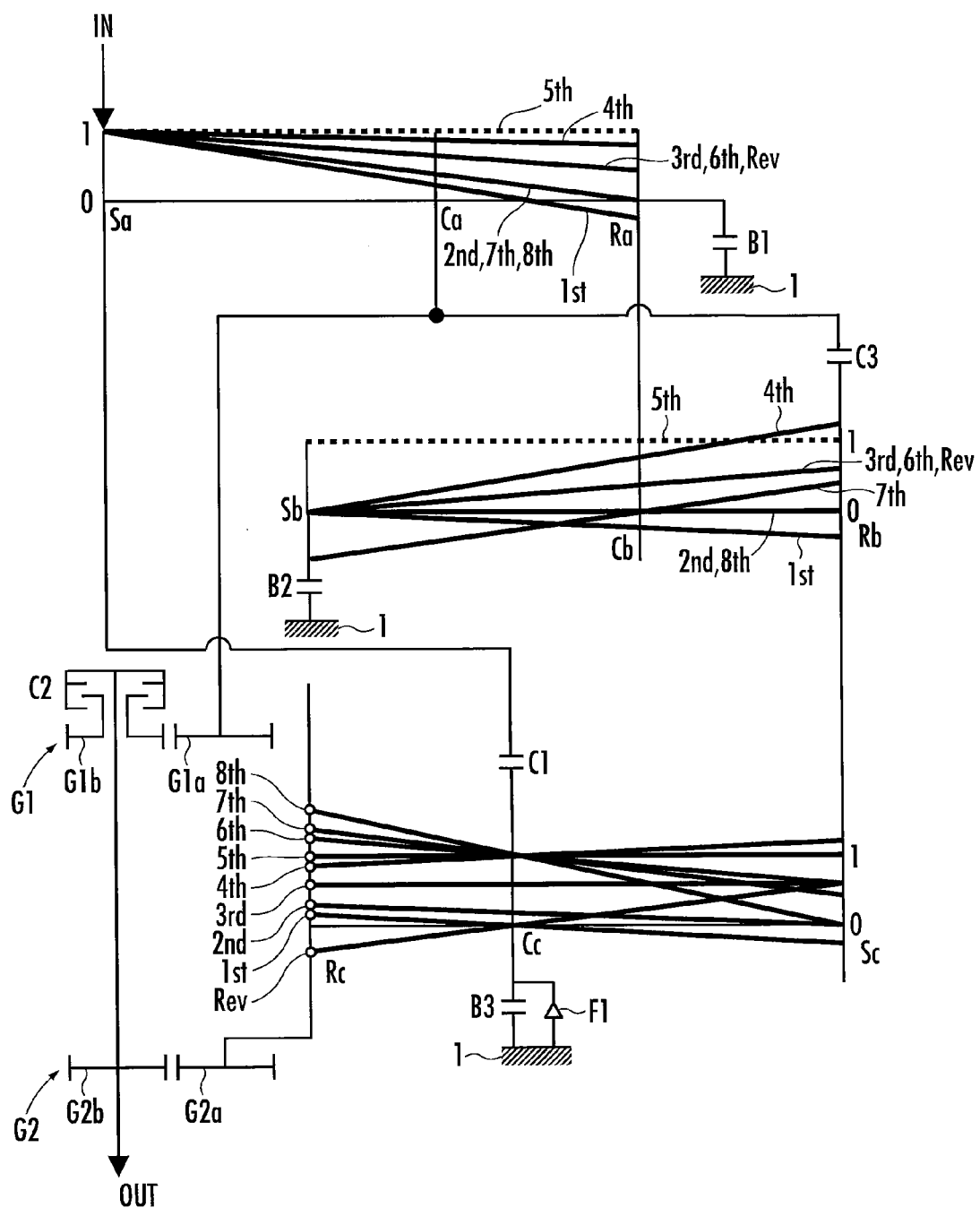
FIG. 2 is a velocity diagram for the automatic transmission according to the first embodiment of the present invention.

Referring to the top section of a velocity diagram (a diagram illustrating rotation velocities of three elements of the sun gear, the carrier and the ring gear by straight lines) for the first planetary gear mechanism 4 in FIG. 2, if the three elements composed of the sun gear Sa, the carrier Ca and the ring gear Ra of the first planetary gear mechanism 4 are arranged from the left side in the order of distances relative to gear ratios in the velocity diagram, they are equivalent to the first element, the second element and the third element, respectively.

Herein, when the gear ratio (number of teeth of the ring gear/number of teeth of the sun gear) of the first planetary gear mechanism 4 is supposed to be "i", the ratio of a distance between the sun gear Sa and the carrier Ca to a distance between the carrier Ca and the ring gear Ra is set to i:1. In the velocity diagram, the lower horizontal line and the upper horizontal line indicate a rotational speed of "0" and a rotational speed of "1" (equal to that of the input shaft 2), respectively.

The second planetary gear mechanism 5 is of a single-pinion planetary gear mechanism comprised of a sun gear Sb, a ring gear Rb and a carrier Cb pivotally supporting a pinion Pb intermeshed with the sun gear Sb and the ring gear Rb in such a way that the pinion Pb can rotate and revolve freely.

Referring to the middle section of a velocity diagram for the second planetary gear mechanism 5 in FIG. 2, if the three elements composed of the sun gear Sb, the carrier Cb and the ring gear Rb of the second planetary gear mechanism 5 are arranged from the left side in the order of distances relative to gear ratios in the velocity diagram, they are equivalent to the fourth element, the fifth element and the sixth element, respectively. When the gear ratio of the second planetary gear mechanism 5 is supposed to be "j", the ratio of a distance between the sun gear Sb and the carrier Cb to a distance between the carrier Cb and the ring gear Rb is set to j:1.

The third planetary gear mechanism 6 is of a single-pinion planetary gear mechanism comprised of a sun gear Sc, a ring gear Rc and a carrier Cc pivotally supporting a pinion Pc intermeshed with the sun gear Sc and the ring gear Rc in such a way that the pinion Pc can rotate and revolve freely.

Referring to the bottom section of a velocity diagram for the third planetary gear mechanism 6 in FIG. 2, if the three elements composed of the ring gear Rc, the carrier Cc, and the sun gear Sc of the third planetary gear mechanism 6 are arranged from the left side in the order of distances relative to gear ratios in the velocity diagram, they are equivalent to the seventh element, the eighth element and the ninth element, respectively. When the gear ratio of the third planetary gear mechanism 6 is supposed to be "k", the ratio of a distance between the sun gear Sc and the carrier Cc to a distance between the carrier Cc and the ring gear Rc is set to k:1.

The automatic transmission of the first embodiment is provided with a first gear train G1 composed of a first driving gear G1a and a first driven gear G1b intermeshed with the first driving gear G1a, and a second gear train G2 composed of a second driving gear G2a and a second driven gear G2b intermeshed with the first driving gear G1b.

The first driving gear G1a is coupled with the carrier Ca (the second element) of the first planetary gear mechanism 4, and the first driven gear G1b is pivotally supported on the output shaft 3. The second driving gear G2a is coupled with the ring gear Rc (the seventh element) of the third planetary gear mechanism 6, and the second driven gear G2b is fixed to the output shaft 3.

The sun gear Sa (the first element) of the first planetary gear mechanism 4 is coupled with the input shaft 2. The ring gear Ra (the third element) of the first planetary gear mechanism 4 and the carrier Cb (the fifth element) of the second planetary gear mechanism 5 are coupled to form a first coupling body Ra-Cb. The ring gear Rb (the sixth element) of the second planetary gear mechanism 5 and the sun gear Sc (the ninth element) of the third planetary gear mechanism 6 are coupled to form a second coupling body Rb-Sc.

In the automatic transmission of the first embodiment, a total number of 7 rotation bodies are constituted in the three planetary gear mechanisms 4, 5 and 6, specifically, the sun gear Sa (the first element) and the carrier Ca (the second element) of the first planetary gear mechanism 4, the first coupling body Ra-Cb (the third-fifth elements), the sun gear Sb (the fourth element) of the second planetary gear mechanism 5, the second coupling body Rb-Sc (the sixth-ninth elements), the ring gear Rc (the seventh element) and the carrier Cc (the eighth element) of the third planetary gear mechanism 6.

The automatic transmission of the first embodiment is provided with engagement mechanisms comprised of wet multi-plate clutches, specifically, a first clutch C1 equivalent to a first engagement mechanism coupled with the input shaft 2 and the carrier Cc (the eighth element) of the third planetary gear mechanism 6 releasably, a second clutch C2 equivalent to a second engagement mechanism coupling the first driven gear G1b of the first gear train G1 to the output shaft 3 releasably, and a third clutch C3 equivalent to a third engagement mechanism coupled with the carrier Ca (the second element) of the first planetary gear mechanism 4 and the second coupling body Rb-Sc (the sixth-ninth elements) releasably.

The automatic transmission of the first embodiment is provided with engagement mechanisms comprised of wet multi-plate brakes, specifically, a first brake B1 equivalent to a fourth engagement mechanism fixing the first coupling body Ra-Cb (the third-fifth elements) to the transmission case 1 releasably, a second brake B2 equivalent to a fifth engagement mechanism fixing the sun gear Sb (the fourth element) of the second planetary gear mechanism 5 to the transmission case 1 releasably, and a third brake B3 fixing the Carrier Cc (the eighth element) of the third planetary gear mechanism 6 to the transmission case 1 releasably.

A 1-way clutch F1 is disposed in parallel with the third brake B3 inside the transmission case 1, allowing the carrier Cc (the eighth element) of the third planetary gear mechanism 6 to rotate positively (forward rotation) and preventing it from rotating negatively (reverse rotation). The third brake B3 and the 1-way clutch F1 in the automatic transmission of the first embodiment constitute a sixth engagement mechanism of the present invention.

In the automatic transmission of the first embodiment, the second clutch C2 (the second engagement mechanism) and the second brake B2 (the fifth engagement mechanism) are engaged so as to establish a first gear speed. When the second clutch C2 is engaged, setting the gear ratio (the number of teeth of the driven gear/the number of teeth of the driving gear) of the first gear train as "m" and the gear ratio of the second gear train as "n", the ring gear Rc (the seventh element) of the third planetary gear mechanism 6 rotates at a rotation speed equal to n/m of the rotation speed of the carrier Ca (the second element) of the first planetary gear mechanism 4.

When the second brake B2 is engaged, the rotation speed of the sun gear Sb (the fourth element) of the second planetary gear mechanism 5 becomes equal to "0", and the rotation speed of the carrier Cc (the eighth element) of the third planetary gear mechanism 6 becomes equal to "0" due to the function of the 1-way clutch F1.

Thereby, the velocity line of the three planetary gear mechanisms 4, 5 and 6 becomes a line denoted by "1st" in FIG. 2, the output shaft 3 rotates at a rotation speed equal to 1/n of the rotation speed of the ring gear Rc (the seventh element) of the third planetary gear mechanism 6, and the first gear speed is established.

At this time, the third brake B3 (the sixth engagement mechanism) is released, however, since the rotation speed of the carrier Cc (the eighth element) of the third planetary gear mechanism 6 becomes equal to "0" due to the function of the 1-way clutch F1, no friction loss will occur in the third brake B3.

Moreover, the disposition of the 1-way clutch F1 makes it unnecessary to supply pressured oils to the third brake B3 and to stop supplying pressured oils thereto when the gear change is made between the first gear speed and the second gear speed, which improves the control on gear change between the first gear speed and the second gear speed.

In addition to the second clutch C2 and the second brake B2, when the third brake B3 is further engaged, the first gear speed is established with the engine braking in action.

The second clutch C2 (the second engagement mechanism), the first brake B1 (the fourth engagement mechanism) and the second brake B2 (the fifth engagement mechanism) are engaged so as to establish a second gear speed. When the second clutch C2 is engaged, the ring gear Rc (the seventh element) of the third planetary gear mechanism 6 rotates at a rotation speed equal to n/m of the rotation speed of the carrier Ca (the second element) of the first planetary gear mechanism 4.

When the first brake B1 is engaged, the rotation speed of the first coupling body Ra-Cb (the third-fifth elements) becomes equal to "0"; when the second brake B2 is engaged, the rotation speed of the sun gear Sb (the fourth element) of the second planetary gear mechanism 5 becomes equal to "0". The three elements of the second planetary gear mechanism 5 are locked in a state where relative rotations are impossible; therefore, the rotation speed of the second coupling body Rb-Sc (the sixth-ninth elements) also becomes equal to "0".

Thus, the ring gear Rc (the seventh element) of the third planetary gear mechanism 6 rotates at a rotation speed equal to n/m of the rotation speed of the carrier Ca (the second element) of the first planetary gear mechanism 4, the velocity line of the three planetary gear mechanisms 4, 5 and 6 becomes a line denoted by "2nd" in FIG. 2, the output shaft 3 rotates at a rotation speed equal to 1/n of the rotation speed of the ring gear Rc (the seventh element) of the third planetary gear mechanism 6, and the second gear speed is established.

The second clutch C2 (the second engagement mechanism), the third clutch C3 (the third engagement mechanism) and the second brake B2 (the fifth engagement mechanism) are engaged so as to establish a third gear speed. When the second clutch C2 is engaged, the ring gear Rc (the seventh element) of the third planetary gear mechanism 6 rotates at a rotation speed equal to n/m of the rotation speed of the carrier Ca (the second element) of the first planetary gear mechanism 4. When the third clutch C3 is engaged, the carrier Ca (the second element) of the first planetary gear mechanism 4 and the second coupling body Rb-Sc (the sixth-ninth elements) rotate at the same rotation speed.

When the second brake B2 is engaged, the rotation speed of the sun gear Sb (the fourth element) of the second planetary gear mechanism 5 becomes equal to "0". Therefore, the velocity line of the three planetary gear mechanisms 4, 5 and 6 becomes a line denoted by "3rd" in FIG. 2, the output shaft 3 rotates at a rotation speed equal to 1/n of the rotation speed of the ring gear Rc (the seventh element) of the third planetary gear mechanism 6, and the third gear speed is established.

The first clutch C1 (the first engagement mechanism), the second clutch C2 (the second engagement mechanism) and the second brake B2 (the fifth engagement mechanism) are engaged so as to establish a fourth gear speed. When the first clutch C1 is engaged, the carrier Cc (the eighth element) of the third planetary gear mechanism 6 rotates at the same rotation speed of "1" as a driving source thereof. When the second clutch C2 is engaged, the ring gear Rc (the seventh element) of the third planetary gear mechanism 6 rotates at a rotation speed equal to n/m of the rotation speed of the carrier Ca (the second element) of the first planetary gear mechanism 4.

When the second brake B2 is engaged, the rotation speed of the sun gear Sb (the fourth element) of the second planetary gear mechanism 5 becomes equal to "0". Therefore, the velocity line of the three planetary gear mechanisms 4, 5 and 6 becomes a line denoted by "4th" in FIG. 2, the output shaft 3 rotates at a rotation speed equal to 1/n of the rotation speed of the ring gear Rc (the seventh element) of the third planetary gear mechanism 6, and the fourth gear speed is established.

The first clutch C1 (the first engagement mechanism), the second clutch C2 (the second engagement mechanism) and the third clutch C3 (the third engagement mechanism) are engaged so as to establish a fifth gear speed. When the first clutch C1 is engaged, the carrier Cc (the eighth element) of the third planetary gear mechanism 6 rotates at the same rotation speed of "1" as the driving source. When the second clutch C2 is engaged, the ring gear Rc (the seventh element) of the third planetary gear mechanism 6 rotates at a rotation speed equal to n/m of the rotation speed of the carrier Ca (the second element) of the first planetary gear mechanism 4.

When the third clutch C3 is engaged, the rotation speed of the carrier Ca (the second element) of the first planetary gear mechanism 4 and the second coupling body Rb-Sc (the sixth-ninth element) rotate at the same rotation speed. Therefore, the velocity line of the three planetary gear mechanisms 4, 5 and 6 becomes a line denoted by "5th" in FIG. 2, the output shaft 3 rotates at a rotation speed equal to 1/n of the rotation speed of the ring gear Rc (the seventh element) of the third planetary gear mechanism 6, and the fifth gear speed is established.

The first clutch C1 (the first engagement mechanism), the third clutch C3 (the third engagement mechanism) and the second brake B2 (the fifth engagement mechanism) are engaged so as to establish a sixth gear speed. When the first clutch C1 is engaged, the carrier Cc (the eighth element) of the third planetary gear mechanism 6 rotates at the same rotation speed of "1" as the driving source. When the third clutch C3 is engaged, the carrier Ca (the second element) of the first planetary gear mechanism 4 and the second coupling body Rb-Sc (the sixth-ninth element) rotate at the same rotation speed.

When the second brake B2 is engaged, the rotation speed of the sun gear Sb (the fourth element) of the second planetary gear mechanism 5 becomes equal to "0". Therefore, the velocity line of the three planetary gear mechanisms 4, 5 and 6 becomes a line denoted by "6th" in FIG. 2, the output shaft 3 rotates at a rotation speed equal to 1/n of the rotation speed of the ring gear Rc (the seventh element) of the third planetary gear mechanism 6, and the sixth gear speed is established.

The first clutch C1 (the first engagement mechanism), the third clutch C3 (the third engagement mechanism) and the first brake B1 (the fourth engagement mechanism) are engaged so as to establish a seventh gear speed. When the first clutch C1 is engaged, the carrier Cc (the eighth element) of the third planetary gear mechanism 6 rotates at the same rotation speed of "1" as the driving source. When the third clutch C3 is engaged, the carrier Ca (the second element) of the first planetary gear mechanism 4 and the second coupling body Rb-Sc (the sixth-ninth element) rotate at the same rotation speed.

When the first brake B1 is engaged, the rotation speed of the first coupling body Ra-Cb becomes equal to "0". Therefore, the velocity line of the three planetary gear mechanisms 4, 5 and 6 becomes a line denoted by "7th" in FIG. 2, the output shaft 3 rotates at a rotation speed equal to 1/n of the rotation speed of the ring gear Rc (the seventh element) of the third planetary gear mechanism 6, and the seventh gear speed is established.

The first clutch C1 (the first engagement mechanism), the first brake B1 (the fourth engagement mechanism) and the second brake B2 (the fifth engagement mechanism) are engaged so as to establish an eighth gear speed. When the first clutch C1 is engaged, the carrier Cc (the eighth element) of the third planetary gear mechanism 6 rotates at the same rotation speed of "1" as the driving source. When the first brake B1 is engaged, the rotation speed of the first coupling body Rb-Cb becomes equal to "0".

When the second brake B2 is engaged, the rotation speed of the sun gear Sb (the fourth element) of the second planetary gear mechanism 5 becomes equal to "0". Therefore, the velocity line of the three planetary gear mechanisms 4, 5 and 6 becomes a line denoted by "8th" in FIG. 2, the output shaft 3 rotates at a rotation speed equal to 1/n of the rotation speed of the ring gear Rc (the seventh element) of the third planetary gear mechanism 6, and the eighth gear speed is established.

The third clutch C3 (the third engagement mechanism), the second brake B2 (the fifth engagement mechanism) and the third brake B3 (the sixth engagement mechanism) are engaged so as to establish a reverse gear speed. When the third clutch C3 is engaged, the carrier Ca (the second element) of the first planetary gear mechanism 4 and the second coupling body Rb-Sc (the six-ninth elements) rotate at the same rotation speed. When the second brake B2 is engaged, the rotation speed of the sun gear Sb (the fourth element) of the second planetary gear mechanism 5 becomes equal to "0".

When the third brake B3 is engaged, the rotation speed of the carrier Cc (the eighth element) of the third planetary gear mechanism 6 becomes equal to "0". Therefore, the velocity line of the three planetary gear mechanisms 4, 5 and 6 becomes a line denoted by "Rev" in FIG. 2, the output shaft 3 rotates at a rotation speed equal to 1/n of the rotation speed of the ring gear Rc (the seventh element) of the third planetary gear mechanism 6, and the reverse gear speed is established.

Each of the dotted velocity lines in FIG. 2 denotes that each element of the other planetary gears in the three planetary gear mechanisms 4, 5 and 6 is rotating in follow of the planetary gear transmitting the driving force.

FIG. 3 is an explanatory diagram illustrating relationships between each of the mentioned gear speeds and each of the engagement states of the mentioned engagement mechanisms of C1 to C3 and B1 to B3. The sign "0" denotes engagement. FIG. 3 illustrates a gear ratio (rotation speed of the input shaft 2/rotation speed of the output shaft 3) of each gear speed when the gear ratio i of the first planetary gear mechanism 4 is set at 1.666, the gear ratio j of the second planetary gear mechanism 5 is set at 1.666, the gear ratio k of the third planetary gear mechanism 6 is set at 1.666, the gear ratio m of the first gear train G1 is set at 0.923, and the gear ratio n of the second gear train G2 is set at 1.000. Thereby, a common ratio (a ratio between gear ratios of each gear speed) becomes appropriate, and a ratio range (the first speed ratio/the eighth speed ratio) of 8 gear speeds denoted in the common ratio column also becomes appropriate.

According to the automatic transmission of the first embodiment, the gear change can be performed to generate the 8 forward gear speeds, and for each gear speed, there are three engagement mechanisms out of the six engagement mechanisms of the first engagement mechanism C1 to the third engagement mechanism C3 and the fourth engagement mechanism B1 to the sixth engagement B3 engaged. Thereby, in each gear speed change, the freed engagement mechanisms are three. In comparison with the conventional transmission in which the freed engagement mechanisms are four, the friction loss caused by the freed engagement mechanisms is reduced, and consequently, the efficiency of the automatic transmission is improved.

According to the automatic transmission of the first embodiment, the rotations of the input shaft 2 are transmitted to the output shaft 3 via the first gear train G1 or the second gear train G2. Therefore, it is easy to change the gear ratio for each gear speed by adjusting the gear ratios m and n of the two gear trains G1 and G2, improving the freedom in setting the gear ratio for each gear speed.

According to the automatic transmission of the first embodiment, all the three planetary gear mechanisms 4, 5 and 6 are constructed of the single-pinion planetary gear mechanism. Therefore, in comparison with the case where at least one of the three planetary gear mechanisms 4, 5 and 6 is constructed of a double-pinion planetary gear mechanism composed a sun gear, a ring gear and a carrier pivotally supporting a pair of pinions, which are intermeshed with each other with either one intermeshed with the sun gear and the other one intermeshed with the ring gear, in such a way that the pair of pinions can rotate and revolve freely, it is possible to reduce the number of intermeshing times of gears, improving the efficiency of the automatic transmission.

The automatic transmission of the first embodiment is described to perform gear change between the 8 forward gear speeds; however, it is acceptable to configure the automatic transmission to perform gear change between 7 forward gear speeds by omitting either one of the gear speeds. For example, the seventh gear speed in the first embodiment may be omitted and the eighth gear speed is set as the seventh gear speed, the automatic transmission can perform gear change between 7 forward gear speeds.

Figure 4:
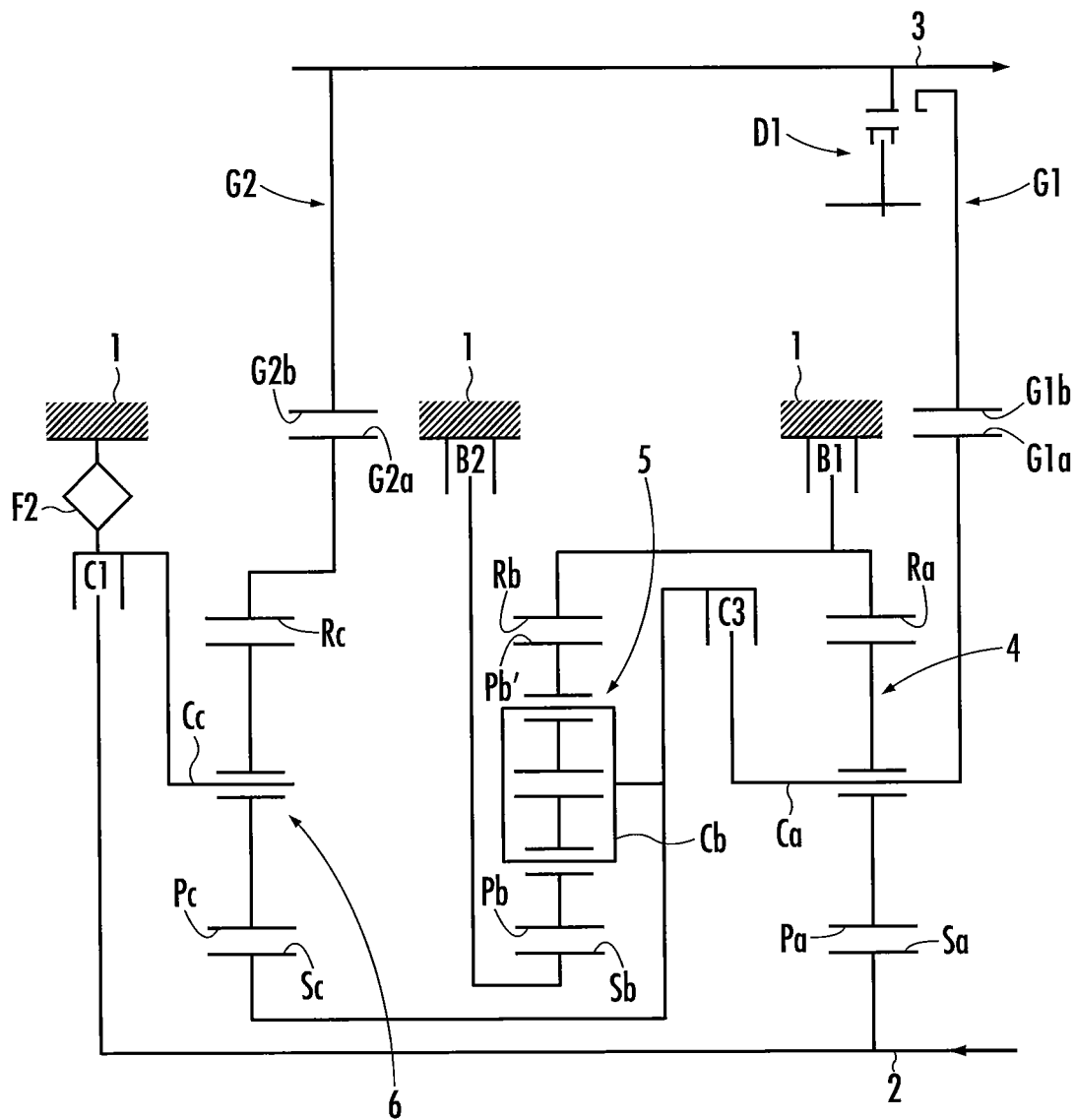
FIG. 4 is a skeleton diagram of an automatic transmission according to a second embodiment of the present invention.

In the automatic transmission of the first embodiment, the second planetary gear mechanism 5 is configured as a single-pinion type; however, as an automatic transmission of a second embodiment illustrated in FIG. 4, it is acceptable to configure the second planetary gear mechanism 5 to a double-pinion type. In this regard, for example, the fourth element may be set as the sun gear Sb, the fifth element may be set as the ring gear Rb and the sixth element may be set as the carrier Cb.

In the automatic transmission of the first embodiment, the sixth engagement mechanism is configured as the third brake B3 and the 1-way clutch F1; however, it is acceptable to omit the 1-way clutch F1 and leave only the third brake B3.

Moreover, as the automatic transmission of the second embodiment illustrated in FIG. 4, it is acceptable to configure the sixth engagement mechanism as a 2-way clutch F2 capable of switching between a state where the positive rotation (forward rotation) of the carrier Cc (the eighth element) of the third planetary gear mechanism 6 is allowed and the negative rotation (reverse rotation) thereof is prevented and a state where the positive rotation of the carrier Cc is prevented and the negative rotation thereof is allowed.

In this regard, similar to the case where the 1-way clutch F1 is disposed, the control on the gear change between the first gear speed and the second gear speed can be improved. Moreover, the third brake B3, which is used in reverse gear change and has a relatively large volume, may be omitted, therefore, the friction loss caused by the dragging from the sixth engagement mechanism in the gear speeds from the second gear speed to the eighth gear speed where the sixth engagement mechanism is released. Thus, in the gear speeds from the second gear speed to the eighth gear speed, the released engagement mechanisms which cause the friction loss are two, thereby, the friction loss can be further reduced, improving the efficiency of the automatic transmission.

In the automatic transmission of the second embodiment illustrated in FIG. 4, the second engagement mechanism is comprised of a dog clutch D1 (intermeshing mechanism). As clearly illustrated in FIG. 3, the second engagement mechanism (equivalent to the second clutch C2 of the first embodiment) is engaged in the range of low gear speeds from the first gear speed to the fifth gear speed and released in the range of high gear speeds from the sixth gear speed to the eighth gear speed.

Thus, in the range of low gear speeds from the first to the fifth gear speed where a torque difference between adjacent gear speeds is greater in comparison with the range of high gear speeds, the switching between the engaging states is not performed. The engaging states will be switched only between the fifth gear speed and the sixth gear speed where the torque difference is relatively small. Thereby, the gear change between the fifth gear speed and the sixth gear speed can be performed smoothly.

Different from the wet multi-plate clutch engaged through friction, since the dog clutch D1 is engaged through mechanical intermeshing, there is no friction loss occurred. Therefore, compared with the second engagement mechanism configured from the wet multi-plate clutch C2 in the first embodiment, by configuring the second engagement mechanism from the dog clutch D1, it is possible to further reduce the friction loss in the range of high gear speeds from the sixth gear speed to the eighth gear speed, improving the mileage of the vehicle.

The dog clutch D1, namely the second engagement mechanism, is disposed at the output shaft 3 to which the rotations are transmitted via the first gear train or the second gear train. Therefore, in comparison with an engagement mechanism which is disposed at the input shaft 2 where the planetary gear mechanisms of 4 to 6 and the like are also disposed, relatively greater space can be saved to improve the freedom in arranging and designing the dog clutch D1. In addition, it is acceptable to configure the dog clutch D1 as a synchromesh mechanism or the like having synchromesh functions.

What is claimed is:

1. An automatic transmission which changes rotations of an input shaft into multiple gear speeds transmitted to an output shaft via a plurality of planetary gear mechanisms disposed in a transmission case, comprising:
    three planetary gear mechanisms including a first planetary gear mechanism, a second planetary gear mechanism and a third planetary mechanism,
    a first gear train composed of a first driving gear and a first driven gear intermeshed with the first driving gear, and
    a second gear train composed of a second driving gear and a second driven gear intermeshed with the second driving gear,
    the third planetary gear mechanism is of a single-pinion planetary gear mechanism comprised of a sun gear, a ring gear, and a carrier pivotally supporting a pinion intermeshed with the sun gear and the ring gear in such a way that the pinion can rotate and revolve freely,
    three elements comprised of a sun gear, a carrier and a ring gear of the first planetary gear mechanism are set as a first element, a second element and a third element, respectively, in the order of distances relative to gear ratios in a velocity diagram,
    three elements comprised of a sun gear, a carrier and a ring gear of the second planetary gear mechanism are set as a fourth element, a fifth element and a sixth element, respectively, in the order of distances relative to gear ratios in the velocity diagram,
    three elements comprised of the sun gear, the carrier and the ring gear of the third planetary gear mechanism are set as a seventh element, an eighth element and a ninth element, respectively, in the order of distances relative to gear ratios in the velocity diagram,
    the first element is coupled with the input shaft,
    the second element is coupled with the first driving gear,
    the first driven gear is pivotally supported on the output shaft,
    the ninth element is coupled with the second driving gear,
    the second driven gear is fixed to the output shaft,
    the third element and the fifth element are coupled to form a first coupling body,
    the sixth element and the seventh element are coupled to form a second coupling body,
    a first engagement mechanism couples the input shaft with the eighth element releasably,
    a second engagement mechanism couples the first driven gear to the output shaft releasably,
    a third engagement mechanism couples the second element with the second coupling body releasably,
    a fourth engagement mechanism fixes the first coupling body to the transmission case releasably,
    a fifth engagement mechanism fixes the fourth element to the transmission case releasably,
    a sixth engagement mechanism fixes the eighth element to the transmission case releasably.

2. The automatic transmission according to claim 1, wherein each of the first and the second planetary gear mechanisms is of a single-pinion planetary gear mechanism comprised of a sun gear, a ring gear, and a carrier pivotally supporting a pinion intermeshed with the sun gear and the ring gear in such a way that the pinion can rotate and revolve freely.

3. The automatic transmission according to claim 1, wherein the sixth engagement mechanism is a one-way clutch or a two-way clutch.

4. The automatic transmission according to claim 1, wherein the second engagement mechanism is an intermeshing mechanism.

5. The automatic transmission according to claim 1, wherein the second planetary gear mechanism is a double-pinion planetary gear mechanism wherein three elements comprised of a sun gear, a ring gear and a carrier of the second planetary gear mechanism are set as a fourth element, a fifth element and a sixth element, respectively, in the order of distances relative to gear ratios in a velocity diagram.

* * * * *